(12) United States Patent
Bostock et al.

(10) Patent No.: US 6,360,043 B1
(45) Date of Patent: Mar. 19, 2002

(54) HYBRID CHIP PROCESS

(75) Inventors: Roger Mark Bostock; Robert Jones; David Frank Moore, all of Cambridge (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/341,229

(22) PCT Filed: Jan. 7, 1998

(86) PCT No.: PCT/GB98/00031

§ 371 Date: Oct. 18, 1999

§ 102(e) Date: Oct. 18, 1999

(87) PCT Pub. No.: WO98/30926

PCT Pub. Date: Jul. 16, 1998

(30) Foreign Application Priority Data

Jan. 7, 1997 (GB) .............................................. 9700150

(51) Int. Cl.[7] .............................. G02B 6/30; G02B 6/42
(52) U.S. Cl. ............................................ 385/49; 385/88
(58) Field of Search .......................... 385/49, 137, 88, 385/89, 92; 438/42, 43; 216/2

(56) References Cited

U.S. PATENT DOCUMENTS

| | | |
|---|---|---|
| 4,735,677 A | 4/1988 | Kawachi et al. |
| 4,878,727 A | 11/1989 | Boiarski et al. |
| 5,420,953 A * | 5/1995 | Boudreau et al. ............. 385/88 |
| 5,432,878 A | 7/1995 | Smous |
| 5,555,331 A | 9/1996 | Billet et al. |
| 5,557,695 A | 9/1996 | Yamane et al. |

FOREIGN PATENT DOCUMENTS

| | | |
|---|---|---|
| EP | 0 331 333 | 9/1989 |
| EP | 0 694 796 | 1/1996 |
| EP | 0 784 216 | 7/1997 |
| GB | 2 297 626 | 8/1996 |

OTHER PUBLICATIONS

"A Compact Multichannel Transceiver Module Using Planar–Processed Optical Waveguides and Flip–Chip Optoelectronic Components", K.P. Jackson et al., Proceedings of the Electronic Components and Technology Conference (ECTC), San Diego, May 18–20, 1992, pp. 93–97.

"Self–Aligned Optical Flip–Chip OEIC Packaging Technologies", W. Hunziker et al., Proceedings of the European Conference on Optical Communication, Sep. 12–16, 1993, pp. 84–91.

"Silica on SI Waveguides for Self–Aligned Fibre Array Coupling Using Flip–Chip SI V–Groove Technique", Lai Q et al., Metal Finishing, vol. 94, No. 9, Sep. 26, 1996, pp. 1916–1917.

Patent Abstracts of Japan, vol. 008, No. 092 (P–271), Apr. 27, 1984 and JP 59 007913 A.

Patent Abstracts of Japan, vol. 006, No. 185 (E–132), Sep. 21, 1982 and JP 57 100731 A.

* cited by examiner

Primary Examiner—Rodney Bovernick
Assistant Examiner—Michael J. Stahl
(74) Attorney, Agent, or Firm—Frishauf, Holtz, Goodman, Langer & Chick, P.C.

(57) ABSTRACT

The present case concerns the manufacture of hybrid electrooptical chips. A substrate is treated so that it can both provide locations for electrooptical components and be etched so as to generate grooves in which optical fibers can be mounted. During the etching of the grooves any electrooptical component already mounted on the substrate is protected from damage by the etchant by a protective coating. A feature is that optical fibers can be mounted with their cores above the surface of the wafer.

16 Claims, 8 Drawing Sheets

IHC

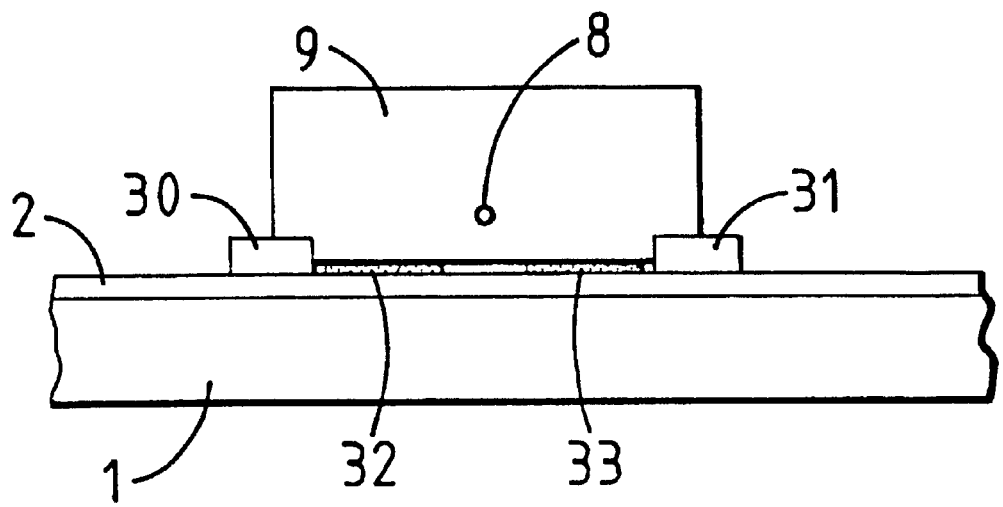
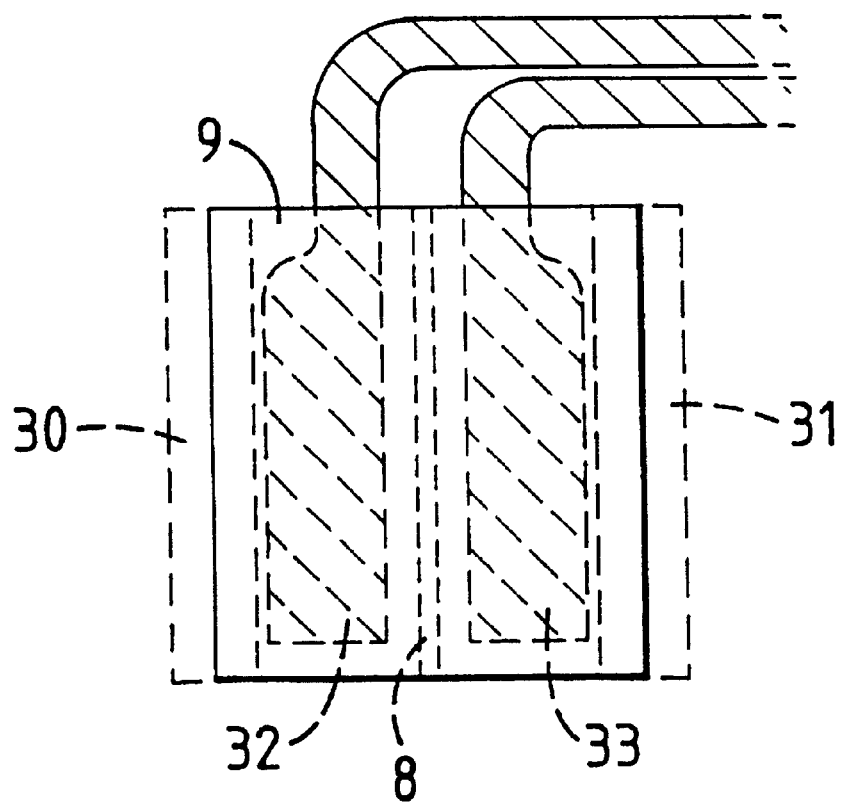

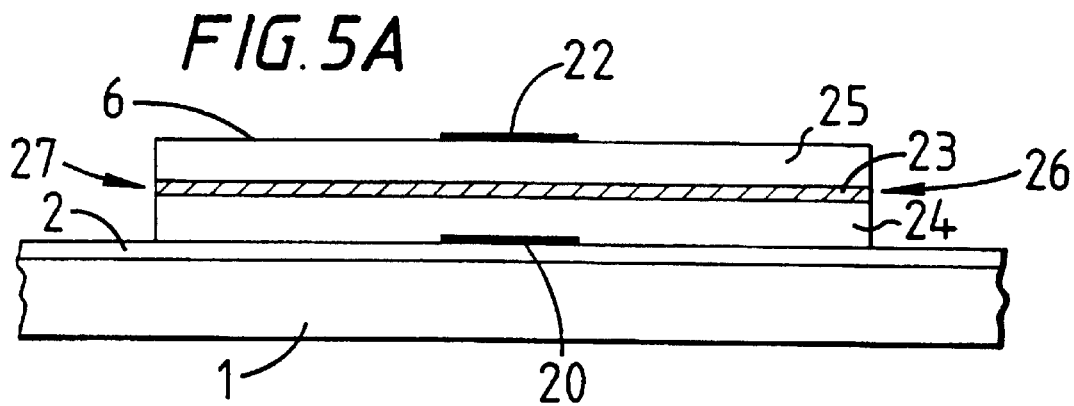
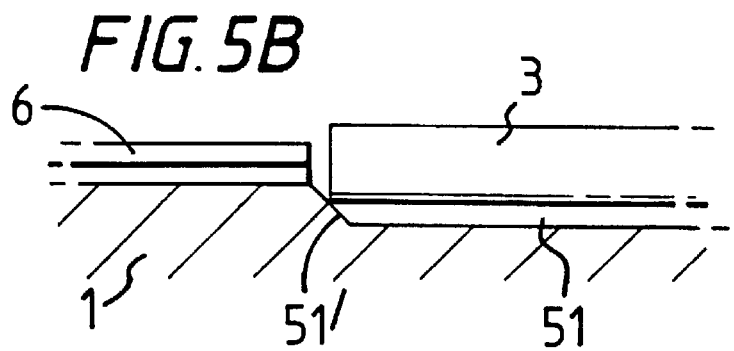
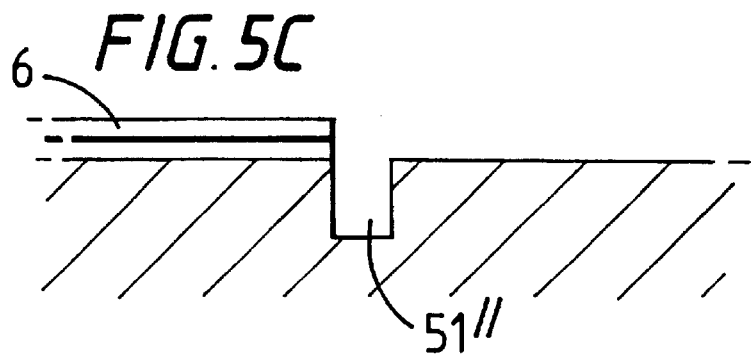
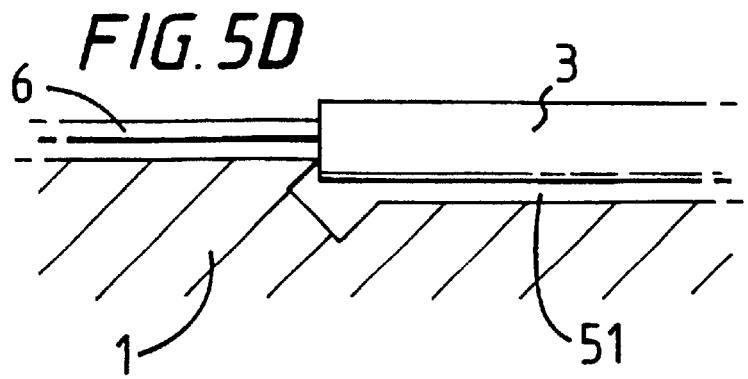

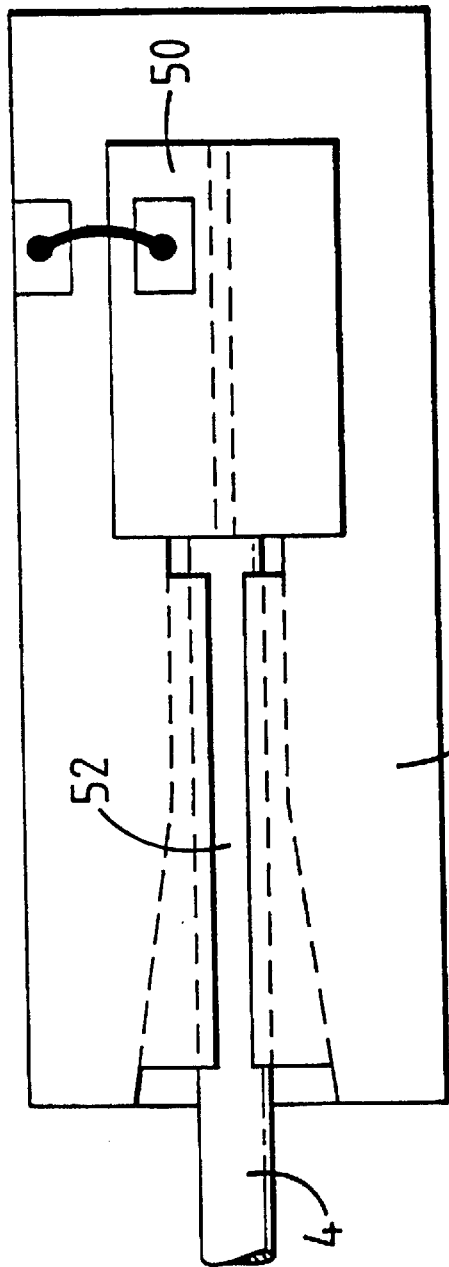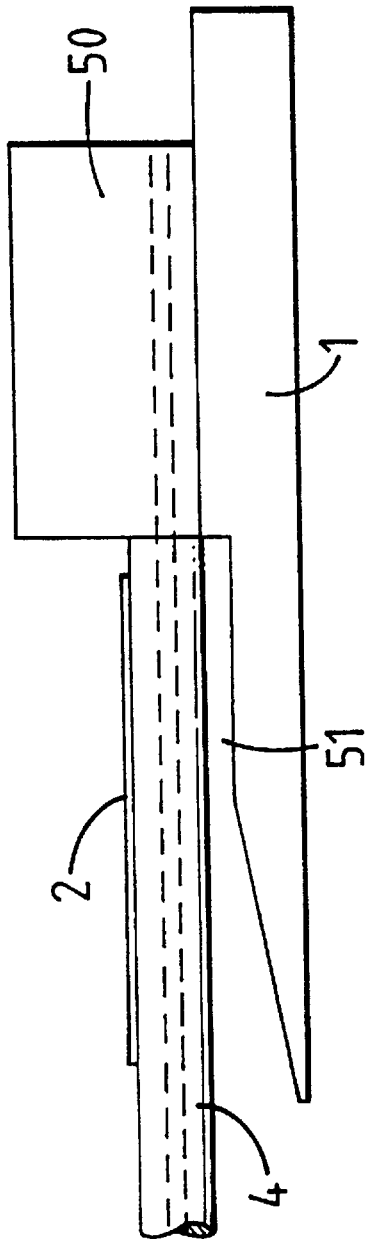
FIG.10A
FIG.10B

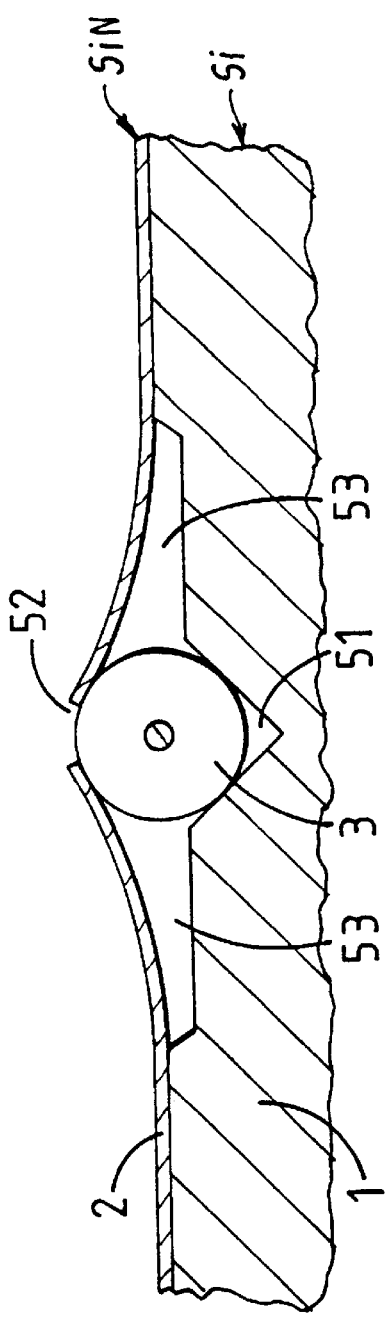
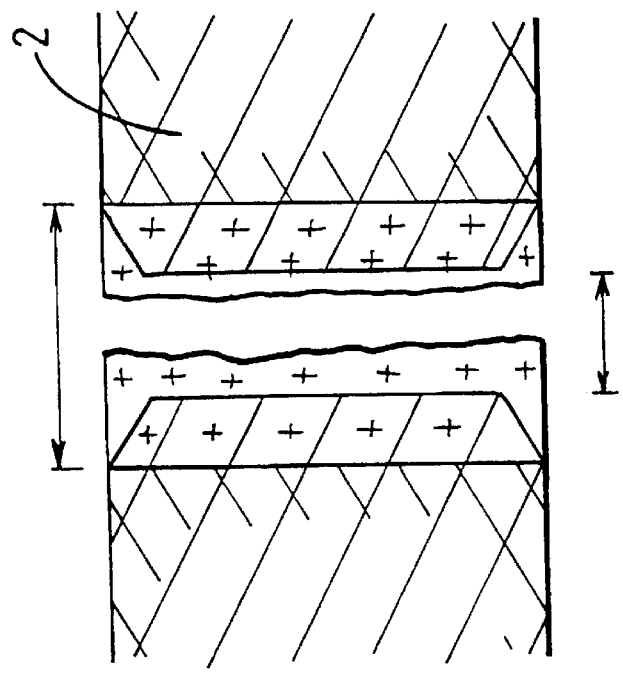

HYBRID CHIP PROCESS

This application is a national stage application corresponding to international application number PCT/GB98/0003 1, filed Jan. 7, 1998.

1. Field of the Invention

The present invention concerns hybrid integrated circuits and finds particular application in the optical fibre field.

2. Background of the Invention

There has been over recent years a substantial increase in the use of fibre optics both for data communication and data manipulation. The advantages afforded by fibre optics are well-known, but in parallel with this expansion there has arisen a particular problem concerning the coupling of optical fibres either to one another or to other components such as waveguides or optoelectronic devices. For example, in order to achieve good coupling efficiency between two monomode optical fibres, or between a monomode fibre and another element, the actual coupling has to be performed with sub-micron accuracy and in a reliable and stable manner. These requirements have meant that the price of providing optical connections between optical fibres and between fibres and other components is extremely high relative to the actual cost of the elements and has accordingly provided a definite brake on the expansion of electro-optical devices and in particular in the manufacture of hybrid electrooptical integrated circuits.

The manufacture of hybrid integrated circuits involves a number of inter-related processes each of which poses problems regarding the interfacing of different types of devices. These devices comprise optical fibres, laser diodes, photodiodes, and waveguides. Also necessary in the production of hybrid integrated circuits are the provision of electrode contact areas, and ways in which the circuits can be connected to the other electronic devices.

There are thus a number of problems to be solved in the manufacture of hybrid optoelectrical circuits. In addition to the accurate location of the various components and in particular that of the fibre optics an important concern is that interconnection between one pair of the various devices which have just been formed on a substrate will not cause problems with regard to the subsequent mounting on or connection to of other devices to other areas, and that a subsequent device mounting step does not damage or weaken a previous step.

In this specification the term "electrooptical component" covers both active components such as laser diodes and photodiodes and passive components such as waveguides. Of course a waveguide can be associated with electrooptical effects which may include the Kerr effect or thermo-optic effect.

SUMMARY OF THE INVENTION

In accordance with one aspect of the present invention there is provided a process of manufacturing a hybrid electrooptical device comprising a process for manufacturing hybrid electrooptical chips comprising:

providing a wafer substrate with a plurality of areas each of which in the final chip is to mount at least one electrooptical component;

treating the surface of the wafer photolithographically so as to generate a mask whereby at least one groove can be anisotropically etched in each area of the substrate so that the groove can mount an optical fibre;

forming features for at least one electrooptical component on each of said areas for connection with an optical fibre when the latter is mounted in said groove; and anisotropically etching the groove in the substrate so that the groove can receive an optical fibre in such a manner that the fibre can be coupled to the electrooptical component.

In accordance with a second aspect of the present invention there is provided a method of mounting an optical fibre in a substrate comprising:

providing the substrate with a protective layer, masking the protective with a first masking layer so that the protective layer can be etched to define a pattern whereby a groove can be anisotropically etched in the substrate, removing the first masking layer;

applying a second masking layer so as to reduce the width of the groove when the latter is anisotropically etched, anisotropically etching the substrate using the second masking layer to form a v-groove in the substrate;

removing the second masking layer, and etching the area of the substrate on either side of the groove to generate recesses on either side of the groove, and mounting an optical fibre in the groove so that the core of the fibre lies above the surface of the protective layer.

In accordance with a third aspect of the present invention there is provided an integrated hybrid chip comprising a substrate, a protective layer on the substrate, a v-groove which has been anisotropically etched in the substrate, and an optical fibre mounted in the substrate and resiliently gripped by portions of the protective layer, the core of the optical fibre lying above the surface of the substrate.

BRIEF DESCRIPTION OF THE DRAWINGS

In order that the present invention may be more readily understood, various embodiments thereof will now be described by way of example and with reference to the accompanying drawings, in which:

FIG. 3 is an end view of the laser diode shown in FIG. 2;

FIG. 4 is a plan view of the laser diode of FIG. 3;

FIG. 5A shows a cross-section of the waveguide shown in FIG. 2;

FIGS. 5B, 5C and 5D illustrate how an optical fibre may be coupled to the waveguide of FIG. 5A;

FIGS. 10A and 10B show the connection between an optical fibre and a laser diode;

FIG. 11 shows an end view of a mounted optical fibre;

FIG. 12 shows a plan view of an additional mask used in the process for mounting the fibre shown in FIG. 11.

DETAILED DESCRIPTION OF THE PREFERRED EMBODIMENT

Figure 1A:
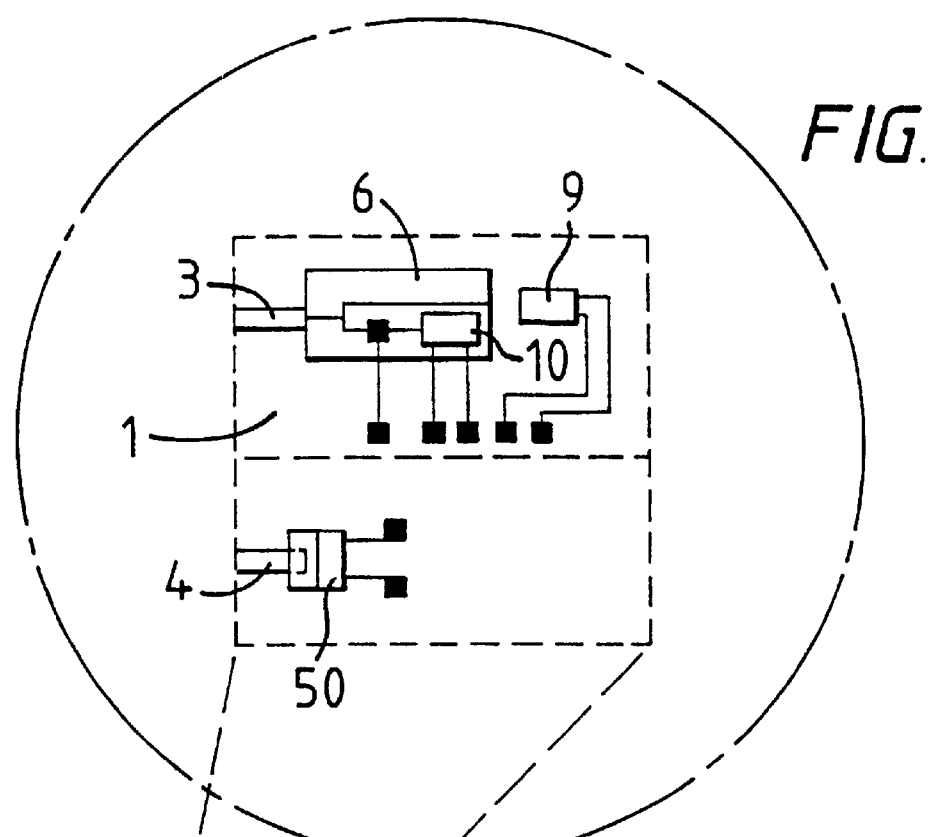
FIG. 1A shows a diagrammatic enlargement of an area of the wafer of FIG. 1.
Figure 1:
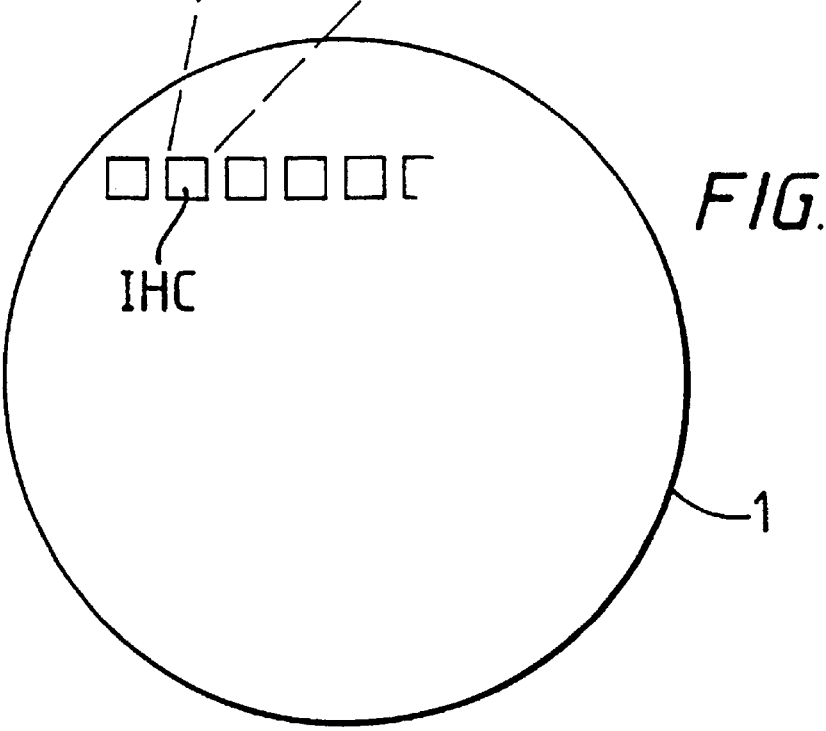
FIG. 1 is a plan view of a wafer.

Referring now to FIG. 1 of the drawings, this shows a wafer in the form of a circular silicon substrate. As is well known in the art, the wafer is circular as one important method of depositing layers onto the wafer is by what is known as spinning the material to be deposited. This single wafer will provide the substrates for a large number of hybrid integrated chips and the area occupied by a single potential chip is indicated at IHC. FIG. 1A shows IHC in an enlarged scale. It will be appreciated that the components shown on the single chip in FIG. 1A do not represent a functional circuit. The chip merely illustrates the most important components that can be used in the manufacture of a functional hybrid electrooptical integrated circuit. These figures are not to scale. It will also be appreciated that during the manufacture of the chips the entire wafer is subjected to a plurality of photolithographic operations and etching operations, which will be described hereinafter to provide the necessary electrical contacts, mounting positions for components, and additionally the formation of waveguides. It is only after these operations have been completed that the single wafer is diced to provide separate chips of the kind shown in FIG. 2. The point at which the surface mounted components are mounted on each chip can be either before or after this dicing operation. However, the insertion of optical fibres into the chips will of necessity be after the dicing operation.

Figure 2:
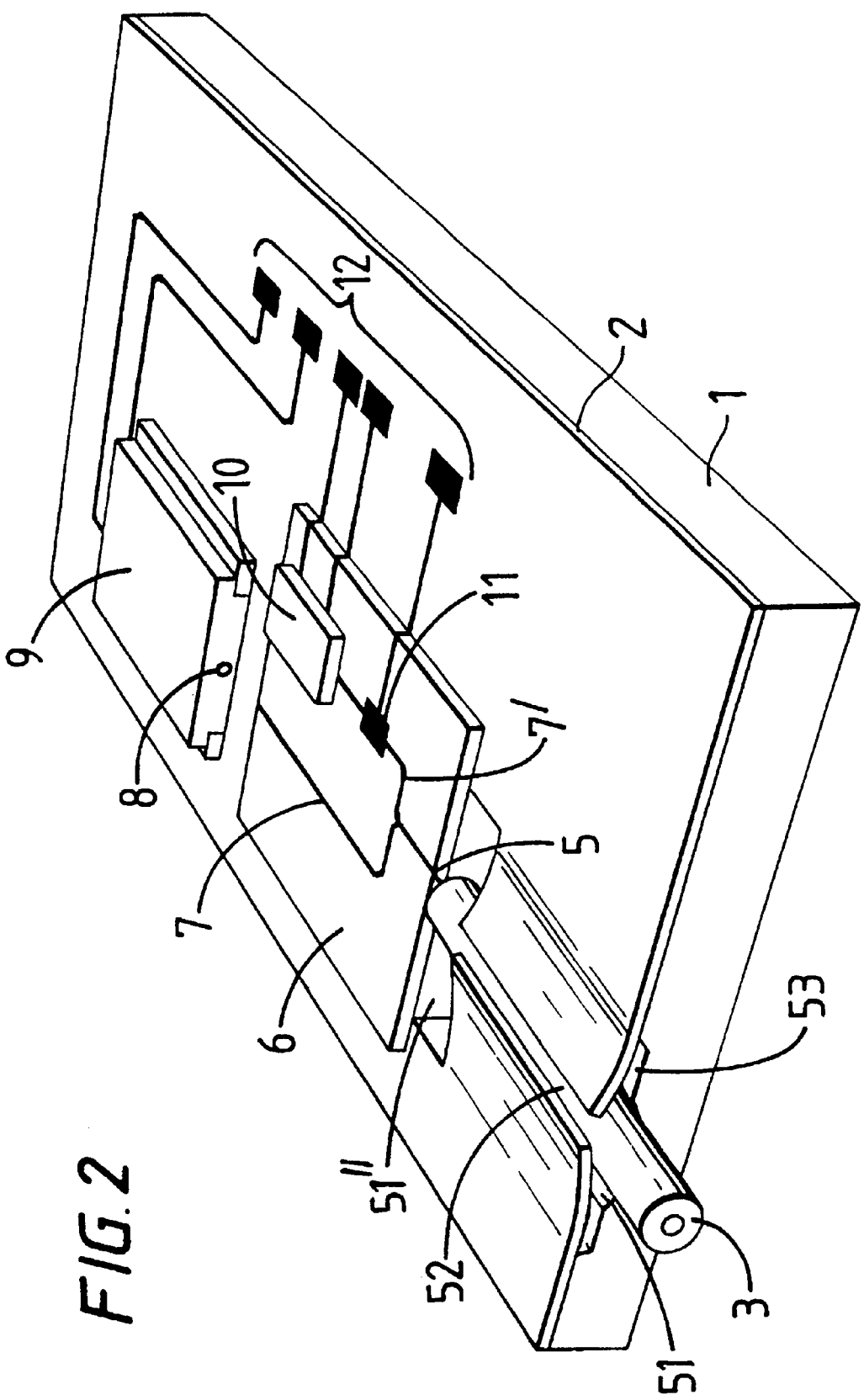
FIG. 2 is a perspective view of a hybrid electrooptical chip.

Referring now to the chips shown in FIG. 1A and FIG. 2, these comprise a substrate 1 of crystalline silicon having a resistant coating layer 2 of silicon nitride or of another suitable material which can be a glassy material.

The chip shown in FIG. 1A has two optical fibres 3 and 4 mounted therein. As will be described hereinafter, each of these fibres is mounted in a slightly different manner. In the interests of simplicity the chip shown in FIG. 2 shows only the first of these two optical fibres, namely fibre 3. This optical fibre 3 leads to the entry portion 5 of a waveguide 6 mounted on the silicon nitride layer 2. One arm 7 of the waveguide leads to the light output 8 of a laser diode 9 and the other arm 7' of the waveguide is connected to a photodiode 10. The arm 7' is also coupled to a contact 11 by means of which an electric field can be applied to the arm so as to alter the refractive index of the waveguide. This is given purely as an example of one of the many ways in which the capabilities of the waveguide can be varied by a signal from an external source. The laser diode 9, the photodiode 10 and the pad 11 are all connected via appropriate metallised tracks to contact points 12 formed on the silicon nitride layer 2.

There will now be described a sequence of steps by means of which each of the main components just described can be provided on the chip. Once the individual processes have been described there will then be given a description of a comprehensive process in accordance with the present invention by means of which individual electrooptical integrated hybrid chips can be manufactured from the wafer shown in FIG. 1.

An important component in the manufacture of a hybrid electrooptical chip is the laser diode. The process followed in mounting the laser diode 9 will now be described.

Referring now to FIG. 3, this is an end view of the laser diode which as already mentioned emits light at 8. In the exemplary embodiment shown in FIG. 2, this active spot is coupled to the arm 7 of the waveguide 6. It is, of course, equally possible for the output of the laser diode to be coupled to an optical fibre. It is important that the main body of the laser diode is accurately located with respect to the remainder of the chip. This is achieved by a pair of stands 30 and 31 standing proud of the silicon nitride layer 2. These stands are located on either side of contacts 32 and 33. FIG. 4 of the drawings shows the spatial relationship (not to scale) between the contacts and the stands. In this figure the active stripe of the laser diode is shown at 8.

The steps involved in the mounting of the laser diode are as follows. Firstly a material such as polysilicon is deposited over the silicon nitride layer 2. This layer is photolithographically patterned and then etched using a suitable etchant. The nature of the etchant will depend on the nature of the material of the layer. The purpose of these steps is to produce the two stands 30 and 31 on each of the chips in the wafer 1. The actual steps of the procedure are conventional. Next the contacts 32 and 33 are deposited on the silicon nitride layer 2. Finally, the laser diode 9 is mounted on the stands 20, 21 and in contact with the contacts 32, 33, by what is known as flip-chip soldering or by using a conductive glue. The height of the stands 30, 31 is carefully selected so that the light output 8 is at the correct height above the surface of the substrate in relation both to the active layer of the waveguide 5 and, as will be described later, in relation to the core of an optical fibre. As already described, the laser diode may be coupled directly to a waveguide or may be coupled to an optical fibre.

There will now be described the process by means of which the waveguide 6 is formed on the wafer. It will again be appreciated that this process is repeated for each of the many chips to be manufactured from the single wafer so that if the wafer carries 100 chips each step of this process is carried out simultaneously on each of the chips.

Referring now to FIG. 5A of the drawings, this is a cross-section (not to scale) of the waveguide 6. The waveguide comprises a lower electrode 20 and an upper electrode 22. The active waveguide layer is shown at 23 and this is sandwiched by buffer layers 24 and 25.

The first step in the manufacture of the waveguide is the deposition of an aluminum layer over the silicon nitride layer 2. This aluminum layer is patterned and etched in a well-known photolithographic manner to generate the lower electrodes 20. The next stage is to spin on the lower buffer layer 24 and the central active layer 23. The active layer 23 is patterned using ultraviolet light to define the actual path of the waveguide as shown in FIG. 2 by 7 and 7'. Next the upper buffer layer 25 is spun on. The next step in producing the actual waveguide comprises masking the substrate with a chromium layer so as to enable the unwanted areas of the waveguide sandwich to be etched away using a reactive ion etch. This process enables the waveguide which remains to have vertical end faces 26 and 27. The verticality of these end faces is important when light is to be coupled into or out of the waveguide by means of a fibre optic. It will be seen that as a result of this entire process the active layer of the waveguide is spaced a short distance above the upper surface of the silicon nitride layer 2.

Although the processes by means of which optical fibres will be mounted in the final chip will be described later, FIGS. 5B, 5C and 5D show alternative ways in which the fibre optic 3 can be optically coupled to the active layer 26 of waveguide 6. The fibre 3 is mounted in a v-groove 51. This groove can be etched so as to provide a sloping end face 51'. In such a case the end of the fibre will not abut directly against the active layer 26. Alternatively a vertical pit 51" can be ion etched at the vertical face of waveguide 6. This is done prior to etching groove 51. When etching, as will be described hereinafter, is carried out to etch the groove 51 the pit 51" will reach the configuration shown in FIG. 5D.

Another important coupling arrangement in a hybrid chip is that of a photodiode to a waveguide.

Figure 6:
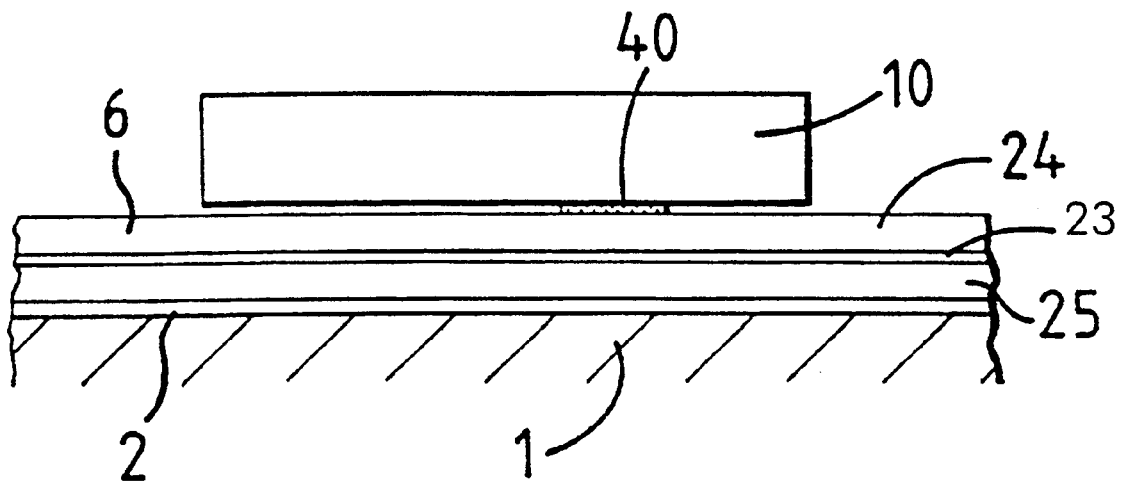
FIG. 6 and 6A are diagrammatic side and top view of the waveguide with a photodiode mounted on it.
Figure 6A:
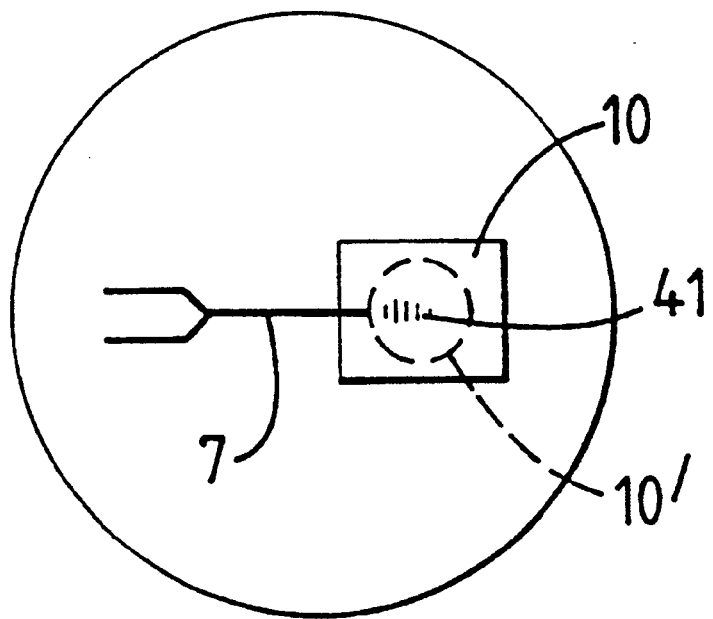

FIG. 2 of the drawings shows a photodiode 10 coupled to arm 7' of waveguide 6. FIG. 6A of the drawings is a diagrammatic side view of photodiode 10 and the waveguide 6. As is well known, the lower face of the photodiode has an active area and this is coupled to waveguide 6 by means of a diffraction grating patterned into the active layer 23 of the waveguide during the patterning of the active layer by the ultraviolet light. The photodiode 10 is either glued, wire bonded or flip-chip bonded to the waveguide. The lower contacts 40 for the photodiode are formed on the upper surface of the upper buffer layer 24 of the waveguide by a photolithographic patterning process. FIG. 6A shows diagrammatically the relationship between the diffraction grating, indicated at 41, on the active layer of the waveguide and the photodiode 10. The active region of the photodiode is indicated at 10'.

As already described, it is necessary for the final manufacture of the integrated hybrid chip to be able to interconnect selected components of the chip with optical fibres. Thus whilst the previous description has been concerned with mounting electrooptical components on the surface of the wafer 1, an extremely important feature of the present invention is the way in which optical fibres are also accurately located in the substrate and coupled to the electrooptical components such as the waveguide and the laser diode. Two ways in which the optical fibres can be mounted will now be described. In the first way the optical fibre is effectively "buried" within the substrate. That is, the core of the fibre lies below the silicon nitride layer 2. The second way of mounting the fibre will hereinafter be referred to as "proud" mounting and in this case the core of the optical fibre lies above the silicon nitride layer 2. In this way, it will be appreciated, the active core of the fibre can be coupled directly to the active layer of the waveguide 6 and the light output 8 of the laser diode 9 which, as already described, lie above silicon nitride layer 2. As the process involved in the proud mounting of an optical fibre involves added steps with regard to the process of mounting a buried fibre, the first process will now be described.

Figure 7:
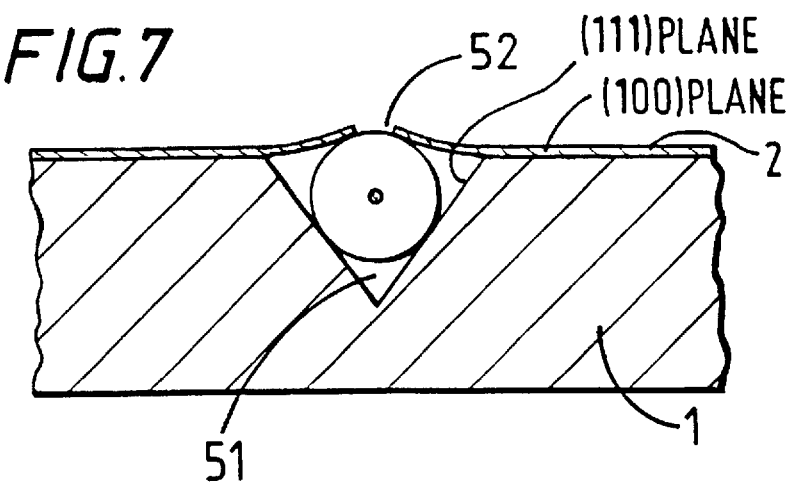
FIG. 7 is an end view showing a buried optical fibre.
Figure 8:
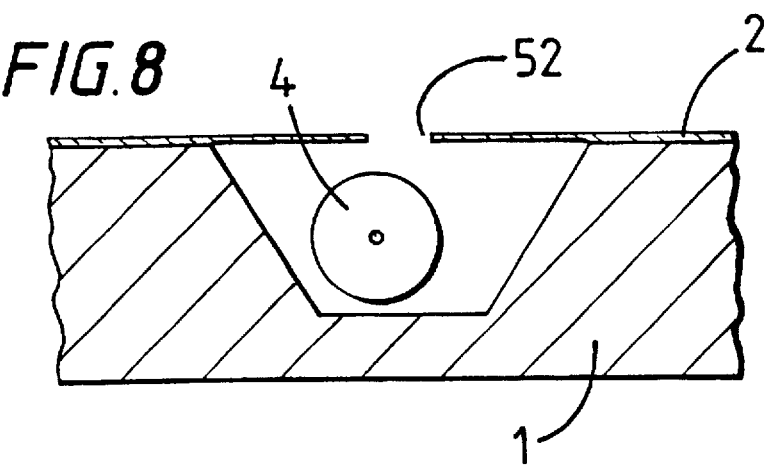
FIG. 8 is a sectional end view of a buried optical fibre.
Figure 9:
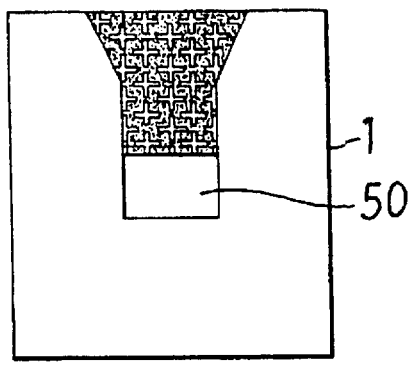
FIG. 9 shows a plan view of the mounting for an optical fibre.

FIG. 1A of the accompanying drawings shows a buried fibre 4 coupled to a laser diode 50. The optical fibre 4 is mounted in a groove 51, the central portion of which is v-shaped as can best be seen from FIG. 7 of the accompanying drawings. At the point where groove 51 reaches the boundaries of the final chip, the groove 51 tapers outwardly to provide an enlarged opening which can best be seen from FIGS. 9 and 10. This tapered opening portion is both deeper and wider than the central v-shaped groove 51. The depth of groove 51 will be in the region of 150 microns. From FIG. 9 it will be seen that the silicon nitride layer 2 has been etched so as to provide resilient lips which grip the fibre 4 as it is inserted into groove 51 via the groove's enlarged opening. The location of the fibre within the groove is entirely passive in that apart from the act of inserting and feeding the fibre no other active adjustment is required. The formation of the groove and the resilient lips is carried out by the following steps. A photolithographic mask is printed over the silicon nitride layer 2. The mask can take the form shown in FIG. 9 but can of course take a number of different configurations. Essentially the mask is required, for each groove in which a fibre is to be mounted, to define a slit 52 in the silicon nitride layer 2 which defines the outermost edges of the resilient lips which act to clamp the inserted fibre. In the second instance it defines the v-groove in the silicon, including the end taper which provides the enlarged opening. This is achieved by the pattern of the spaces in the silicon nitride that allow the silicon etchant to underetch the lips.

The silicon substrate 1 has a specific crystal orientation which allows the etching to be carried out in such a manner as to ensure the required shape for the groove and its entrant portion. Etching can be carried out using potassium hydroxide as a wet etchant.

This etching is carried out in an anisotropic manner as is, for example, described in U.S. Pat. No. 5087124. The etching is carried out in the <100> direction of the crystalline silicon with <111> side walls.

Due to the anisotropy of the silicon etch the final edges of the v-groove are well defined by the edges of the pattern in the mask. This gives a channel whose depth is defined by the mask and is independent of the etchant concentration or the time for which the device is etched. The etch is stopped by the <111> crystal plane which is consistent along the length of the groove 51. The alignment of the fibre 4 inserted into the groove 51 is therefore accurate to the consistency of this crystal plane. The etching of the silicon nitride layer 2 to form the patterns which are underetched to provide the groove 51 can be done in such a manner that the underetching either leaves a single central slit in the silicon nitride layer 2 defined by continuous lips or a plurality of what are effectively cantilever beams extending orthogonally to the fibre axis. During the manufacture of the groove the anisotropy of the silicon etch leaves ridges in the enlarged end portion of the groove as the sides of these portions do not lie parallel to the sides of the crystal plane. These ridges ascend the side walls of the tapered portions at an angle, forming a taper in their own right and guiding the fibre into the groove. These ridges can be further smoothed by a brief isotropic etch to remove the sharpness of the ridge edges.

FIGS. 10A and 10B of the drawings show the buried fibre 4 coupled to the laser diode 50.

However, as described, in many situations such as connections to waveguides or laser diodes, it is advantageous for the core of the optical fibre to lie above the surface of the silicon nitride layer 2. This is the situation with regard to the coupling of fibre 3 to the waveguide 6.

In order to provide this proud mounting of the optical fibre 3 so that the core of the fibre is accurately aligned with the active layer 26 of the waveguide 6, FIG. 11 is an end view of the fibre 3 showing how it is mounted in a v-groove 51 similar to the groove 51 mounting fibre 4 and is also held in place in the groove by resilient lips similar to those holding fibre 4. However it will be seen that in this case the actual v-groove is shallower than in the buried fibre is mounting. This result is achieved as follows. After the silicon nitride layer 2 has been patterned so as to expose the location of a v-groove and also so as to define the regions which are to be underetched so as to provide the resilient lips a second masking layer of silicon oxide is deposited or thermally grown over the patterned silicon nitride layer and over part of the surface of the silicon substrate exposed by the etching of the silicon nitride layer 2. This is the configuration shown in FIG. 12 of the drawings. This second layer narrows the width of the groove which is to be anisotropically etched and as already explained thus limits its depth. When the anisotropic etch is carried out using the potassium hydroxide as in the case of the formation of the groove for the mounting of fibre 4 the lips of the v-groove are defined by the end of the silicon oxide masking. The next step is to remove the second masking layer, for example by using hydrofluoric acid, exposing the planar surface of the silicon substrate extending on either side of the previously anisotropically etched groove via the patterning in the silicon nitride layer 2. A second etch is now carried out using potassium hydroxide to generate the recessed portions 53 shown in FIG. 11 on either side of the central v-groove. The use of the second masking layer as described means that the initial masking pattern can be selected so that the resilient lips or beams can have any desired length. It will also be appreciated that the etching process can be carried out with considerable accuracy so that once the fibre is mounted within the groove its active core will be at the same height as the active layer 23 of the waveguide or, if required, the light output of a laser diode.

The previous description has been concerned with the mounting of individual components to manufacture an electrooptical hybrid circuit of the kind shown in FIG. 2. This has been done so that an understanding can be given of the individual requirements for each component. However the present invention is concerned with a complete process for the manufacture of the complete chip in which the manufacture of the various individual components is integrated.

As already mentioned, the complete progress starts with a circular silicon wafer from which will eventually be cut the individual hybrid chips. Step 1 of the process is to coat the entire wafer with the layer 2 of silicon nitride. One method of achieving this is the well-known process of radio frequency plasma deposition. The next step or step 2 in the complete process is the formation of the stands 30, 31 for the laser diode as described with reference to FIGS. 3 and 4. This is achieved by the deposition onto the silicon nitride layer 2 of a layer of polysilicon. The polysilicon layer is patterned as described to define the locations of the stands 30 and 31 for the laser diode and then etched to leave these stands protruding from the silicon nitride layer 2.

Step 3 in the complete process is the generation of a lithographic masking pattern in the silicon nitride layer 2 which defines the v-grooves and the associated resilient lips or clips in which the optical fibres are to be mounted. Using this pattern the silicon nitride layer 2 is then etched so as to generate the required patterns in the silicon nitride layer from which the v-grooves can subsequently be etched anisotropically by potassium hydroxide. However at this point in the production of the complete chip the anisotropic etching of the v-groove as described with respect to FIGS. 8 to 11 is not carried out.

Step 4 of the process is the deposition of the silicon oxide layer as described in the process of providing the v-groove mounting for the "proud" fibre 3, followed by the formation of a photolithographic pattern on this layer and selectively removing the silicon dioxide layer so as to define the narrow slit for the shallower groove to be generated for "proud" fibre mounting.

Step 5 is the deposition of the patterned aluminum layer which is to provide the contacts 12 shown in FIG. 2, the lower electrodes 20 of the waveguide 6, the contacts 32, 33 of the laser diode 9 plus any other necessary contacts and electrical paths.

Step 6 is the manufacture of the waveguide 6 as set out in the description previously given with regard to FIGS. 3 and 6A of the accompanying drawings.

Step 7 consists of patterning the upper electrodes on the waveguide. The upper electrode on the waveguide also has the function of acting as a mask for the generation of the vertical pit 51' which is required, as already described, to enable the optical fibre 3 to be butted to the active layer 26 of the waveguide.

Step 8 consists of providing a chromium passivation layer over the chip. The purpose of this layer is to protect the waveguide 6 during the etching of the deep pit 51", the v-grooves 51 and the recesses 53 of the proud fibre mounting.

Step 9 consists of the reactive ion etching the vertical pit 51". It will be appreciated that at this point in the process the wafer now has two layers on its surface which mask different areas of the surface, one layer being of chromium and one of aluminum. The reactive ion etch, typically $CF_4 + O_2$, does not affect either the chromium or the aluminum.

Step 10 consists of anisotropically etching the v-grooves for the optical fibres 3 and 4 using a liquid KOH etch. During this etching of the v-grooves the aluminum is removed by the etchant except where it is covered by the chromium exposing the silicon nitride layer 2 to enable the anisotropic etching. The chromium and silicon nitride are unaffected by the KOH etch. In the case of the proud fibre 3 the width, and accordingly the depth, of the v-groove will be set by the silicon oxide masking layer applied at step 4.

Step 11 consists of removing the silicon oxide layer and then carrying out the anisotropic etch of the recesses on either side of the v-groove in the proud fibre mounting again using potassium hydroxide.

During all these etching steps 9 to 11 the waveguide 6 is protected by its chromium passivation layer. Once the final potassium hydroxide-etch has been carried out in step 11, the chromium passivation layer is removed.

The chip is now ready to have the laser and photodiodes mounted on the wafer surface. This is step 12.

The final steps in the procedure consist in step 13 of dicing the wafer into the individual chips, inserting the optical fibres and then bonding the fibres in position.

What is claimed is:

1. A hybrid chip comprising a crystalline substrate, a resistive layer on the surface of the substrate, a v-groove anisotropically etched in the substrate through the resistive layer, and an optical fiber mounted in said v-groove and gripped by portions of the resistive layer, and characterized in that the walls defining the v-groove are stepped by the provision of recesses on either side of the v-groove and in that the distance between the two lips formed by the recesses meeting the walls of the v-groove is less than the diameter of the fiber and is such that the core of the fiber extends above the resistive layer.

2. A chip according to claim 1, wherein the substrate is comprised of crystalline silicon.

3. A chip according to claim 1, wherein the resistive layer is silicon oxide or silicon nitride.

4. A chip according to claim 1, and further comprising an electrooptical component coupled to the optical fiber.

5. A chip according to claim 4, wherein the electrooptical component is a waveguide, the guiding layer of which is the same height above the resistive layer as the core of the optical fiber.

6. A chip according to claim 4, wherein the electrooptical component is a laser diode with the output of the laser diode at the same height above the resistive layer as the core of the optical fiber.

7. A method of manufacturing a miniature mounting device for an optical fiber comprising a first step of photolithographically etching a v-groove in a crystalline substrate through a patterned resistive layer provided on the surface of the crystalline substrate, the process being characterized by etching the v-groove through a restricted slit in the resistive layer so that the width and depth of the v-groove is defined by the width of the slit, and a second step of photolithogaphically etching through a pattern of openings in the resistive layer surrounding said slit recesses on either side of the v-groove etched in said first step so as to leave portions of the resistive layer extending over the etched recesses which are adapted to grip an optical fiber when mounted so that it rests on the lips between said recesses and the v-groove.

8. A process according to claim 7, wherein the resistive layer has a photolithographic pattern formed thereon which defines both the slit through which the v-groove is etched and the openings through which the recesses are etched, and wherein the openings through which the recesses are etched are masked during etching of the v-groove, and the masking of these openings removed for the final etching of the recesses.

9. A process for manufacturing hybrid electrooptical chips comprising:

- a first step of providing a crystalline wafer substrate with a plurality of areas each of which in the final chip is to mount at least one electrooptical component;
- a second step of coating the wafer with a resistant layer, prior to masking of the wafer to define fiber mounting v-grooves, the resistant layer both acting to define surfaces of the wafer to be etched to generate said v-grooves, and providing resilient means for holding optical fibers within the v-grooves;
- a third step of treating the surface of the wafer photolithographically so as to generate a mask whereby at least one of said v-grooves can be anisotropically etched in each area of the substrate so that the v-groove can mount an optical fiber;
- a fourth step of forming features for the attachment of at least one electrooptical component on each of said areas for connection with an optical fiber when such optical fiber is mounted in said v-groove;
- a fifth step of forming-in each area of the wafer at least a waveguide as an electrooptical component, and including, after the wafer has been masked to define said v-grooves, the step of providing the waveguides with a coating layer which acts to protect the waveguides during the anisotropic etching of said v-grooves;
- a sixth step of anisotropically etching the v-groove in the substrate so that the v-groove can receive an optical fiber in such a manner that the fiber can be coupled to the electrooptical component;
- prior to the formation of the waveguides, the steps of forming at each of said areas mounting stands for a laser diode on the resistant layer by a lithographic process which involves coating a layer of poly silicon over the resistant layer, forming a photolithographic mask defining the mounting stands, etching the poly silicon coating layer through the mask to generate said stands, and removing the mask;
- after the formation of said mounting stands and prior to the formation of the waveguides, photolithographically masking the wafer to define the v-groove for each optical fiber in each area of the wafer, and using this mask to etch the resistant layer to define patterns in the resistant layer which enable the substrate of the wafer to be anisotropically etched to generate said v-gooves in which to optical fibers are to be mounted; and
- prior to the formation of the waveguides, subjecting the etched resistant layer to an additional masking process to mask some of the pattern etched in the resistant layer so as to limit the width and depth of a any of said v-grooves subsequently anisotropically etched in the wafer substrate and, also, prior to the formation of the waveguides, depositing a metallic layer to form electrodes for the electrooptical components.

10. A process according to claim 9, wherein said additional masking is a layer of silicon oxide and the metallic layer is aluminum.

11. A process according to claim 9, wherein the step of forming the waveguides follows the step of laying the electrodes, and comprises spinning a lower buffer layer onto the wafer, spinning the active layer for the waveguides over the lower buffer layer, defining the waveguide paths in the active layer, spinning an upper buffer layer over the active layer, masking the wafer, etching away the unwanted areas of the upper and lower buffer layers and the active layer to form the waveguides, and removing the remaining masking layer after the waveguides have been etched and depositing metallic upper electrodes on the waveguides.

12. A process according to claim 11, and comprising masking the waveguides with a protective layer, and reactive ion etching a pit at a vertical end face of each waveguide to enable the active layer of the waveguide to be coupled to an optical fiber.

13. A process according to claim 12, comprising removing the additional masking layer as claimed in claim 9, and etching the edges of the grooves in the wafer which have been exposed by the removal of this additional layer to define recesses along the edges of the grooves.

14. A process according to claim 12, wherein the coating layer which protects the waveguide during the anisotropic etching of the grooves is comprised of chromium.

15. A process according to claim 13, comprising removing the resistant layer, attaching a laser diode to the mounting stands, mounting any other electrooptical components, dicing the wafer to generate the individual chips, and inserting the optical fibers into the respective v-grooves.

16. A process according to claim 9, wherein the wafer is comprised of crystalline silicon and the resistant layer is comprised of silicon nitride.

* * * * *